(12) United States Patent
Hua et al.

(10) Patent No.: US 11,740,603 B2
(45) Date of Patent: Aug. 29, 2023

(54) POWER LOAD PREDICTION METHOD AND APPARATUS, AND STORAGE MEDIUM

(71) Applicant: Siemens Aktiengesellschaft, Munich (DE)

(72) Inventors: Wen Tao Hua, Beijing (CN); Jing Li, Beijing (CN); Hao Liu, Beijing (CN); Dan Wang, Chengdu (CN); Ang Li, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/614,401

(22) PCT Filed: May 29, 2019

(86) PCT No.: PCT/CN2019/089102
§ 371 (c)(1),
(2) Date: Nov. 26, 2021

(87) PCT Pub. No.: WO2020/237539
PCT Pub. Date: Dec. 3, 2020

(65) Prior Publication Data
US 2022/0214655 A1 Jul. 7, 2022

(51) Int. Cl.
*G05B 19/042* (2006.01)
(52) U.S. Cl.
CPC .... *G05B 19/042* (2013.01); *G05B 2219/2639* (2013.01)
(58) Field of Classification Search
None
See application file for complete search history.

(56) References Cited

U.S. PATENT DOCUMENTS 6,577,962 B1 * 6/2003 Afshari ................ G06Q 10/06 700/291
9,129,231 B2 * 9/2015 Kaufman ........... G06Q 10/0639
(Continued)

FOREIGN PATENT DOCUMENTS

| CN | 103853131 A | 6/2014 |
| CN | 104036356 A | 9/2014 |

(Continued)

OTHER PUBLICATIONS

International Search Report and Written Opinion and English translation thereof dated Mar. 6, 2020.
(Continued)

*Primary Examiner* — Jason Lin
(74) *Attorney, Agent, or Firm* — Harness, Dickey & Pierce, P.L.C.

(57) ABSTRACT

Disclosed are a power grid user classification method and device, and a computer-readable storage medium. The method includes: determining user power consumption data of each time period within a time interval, the user power consumption data of each time period including user power consumption data of each time granularity within the time period; generating a power consumption pattern image of a user within the time interval based upon the user power consumption data of each time period within the time interval; and classifying the user based upon an image recognition result of the power consumption pattern image. A user is classified by performing image recognition on a power consumption pattern image, and file information does not need to be manually inputted, thereby reducing a manual workload. In addition, a completion defect caused by incomplete file information is avoided, thereby improving the accuracy of classification.

17 Claims, 4 Drawing Sheets

(56) References Cited

U.S. PATENT DOCUMENTS

| | | | |
|---|---|---|---|
| 2003/0101009 A1* | 5/2003 | Seem | H02J 3/00 702/61 |
| 2005/0096797 A1* | 5/2005 | Matsubara | H02J 3/00 700/291 |
| 2012/0084063 A1* | 4/2012 | Drees | G06Q 10/06 703/6 |
| 2012/0150707 A1* | 6/2012 | Campbell | G06Q 30/04 705/34 |
| 2012/0278051 A1* | 11/2012 | Jiang | G06Q 10/04 703/2 |
| 2012/0330626 A1* | 12/2012 | An | G01K 17/20 703/2 |
| 2013/0127443 A1* | 5/2013 | Honjo | H02J 3/003 324/103 R |
| 2014/0152463 A1 | 6/2014 | Sung | |
| 2015/0331023 A1* | 11/2015 | Hwang | G06Q 10/04 702/60 |
| 2017/0124466 A1 | 5/2017 | Li et al. | |
| 2017/0337644 A1* | 11/2017 | Iyengar | G06Q 50/06 |
| 2018/0255470 A1* | 9/2018 | Zhang | H04L 41/147 |

FOREIGN PATENT DOCUMENTS

| | | |
|---|---|---|
| CN | 108074015 A | 5/2018 |
| CN | 109190856 A | 1/2019 |
| CN | 109308541 A | 2/2019 |
| CN | 109508830 A | 3/2019 |
| TW | 201423291 A | 6/2014 |
| TW | I489230 B | 6/2015 |

OTHER PUBLICATIONS

Mordjaoui Mourad et al.; "Electric load forecasting by using dynamic neural network", International Journal of Hydrogen Energy, Elsevier, Amsterdam, NL, vol. 42, No. 28, Apr. 25, 2017 (Apr. 25, 2017), XP085128760, ISSN: 0360-3199, DOI: 10.1016/J.IJHYDENE. 2017.03.101; 2017.

Feng, Yonghan et al.; "Day-ahead hourly electricity load modeling by functional regression", Applied Energy, Elsevier Science Publishers, GB, vol. 170, Mar. 17, 2016 (Mar. 17, 2016), XP029469811, ISSN: 0306-2619, DOI: 10.1016/J.APENERGY.2016.02.118; 2016.

* cited by examiner

POWER LOAD PREDICTION METHOD AND APPARATUS, AND STORAGE MEDIUM

PRIORITY STATEMENT

This application is the national phase under 35 U.S.C. § 371 of PCT International Application No. PCT/CN2019/089102 which has an International filing date of May 29, 2019, which designated the United States of America, the entire contents of each of which are hereby incorporated herein by reference.

FIELD

Embodiments of the present invention generally relate to the energy field, and in particular to a power load prediction method, apparatus, cloud platform, server and storage medium.

BACKGROUND

The power industry is the main infrastructure in the energy sector, and plays an important role in the development of industry and the quality of life. Power load (for example, the power of equipment such as transformers, etc.) is an important part of the electric power industry, which has a great impact on the stability of grid operation. Continuous overload will cause damage to electrical equipment, for example, transformers. In order to ensure the normal operation of the power grid, it is necessary to monitor the power load in advance.

At present, power load is usually predicted based on the growth rate, and the growth rate is calculated based on user tags. However, the tags of registered users at the administration for power supply are relatively fixed, and these tags cannot reflect the latest conditions of users. Therefore, power load prediction based on the growth rate severely limits the prediction accuracy.

SUMMARY

In view of this, a power load prediction method is proposed in one aspect of the embodiments of the present invention, and a power load prediction apparatus, a cloud platform, a server, a storage medium and a computer program product are provided in another aspect, which are used to improve accuracy of power load prediction.

A power load prediction method proposed in the embodiments of the present invention comprises: acquiring historical power load data in a one-dimensional time series for a set time length, which consists of data corresponding to each time point; converting the historical power load data in the one-dimensional time series to a three-dimensional matrix consisting of set time scales, days in each time scale, and time points in each day; dividing the historical power load data of the three-dimensional matrix into at least one operation mode depending on the size of the time scales; and, in each operation mode, taking the time scale as the unit, deriving the value band of power load data of each day in the operation mode in the next time scale to be predicted based on the historical power load data in each time scale.

A power load prediction apparatus proposed in the embodiments of the present invention comprises: a one-dimensional data acquiring module, used to acquire historical power load data in a one-dimensional time series for a set time length, which consists of data corresponding to each time point; a data conversion module, used to convert the historical power load data in the one-dimensional time series to a three-dimensional matrix consisting of set time scales, days in each time scale, and time points in each day; an operation mode dividing module, used to divide the historical power load data of the three-dimensional matrix into at least one operation mode depending on the size of the time scales; and a data prediction module, used to, in each operation mode, taking the time scale as the unit, derive the value band of power load data of each day in the operation mode in the next time scale to be predicted based on the historical power load data in each time scale.

Another power load prediction apparatus proposed in the embodiments of the present invention comprises: at least one memory and at least one processor, wherein, the at least one memory is used to store a computer program; the at least one processor is used to call the computer program stored in the at least one memory, to execute the power load prediction method described in any of the above implementations.

A cloud platform or server proposed in the embodiments of the present invention comprises a power load prediction apparatus described in any of the above implementations.

A computer-readable storage medium proposed in the embodiments of the present invention has a computer program stored thereon; it is characterized in that the computer program can be executed by a processor and implement the power load prediction method described in any of the above implementations.

A computer program product proposed in the embodiments of the present invention is stored on a computer-readable storage medium, comprises a computer program instruction, which, when executed, causes at least one processor to execute the power load prediction method described in any of the above implementations.

BRIEF DESCRIPTION OF THE DRAWINGS

The preferred embodiments of the present invention will be described in detail below with reference to the drawings, so that those skilled in the art will better understand the above and other features and advantages of the present invention. In the drawings.

In the drawings, the following reference numerals are used:

| Numeral | Meaning |
| --- | --- |
| S102, S104, S106, and S108 | Steps |

-continued

| Numeral | Meaning |
| --- | --- |
| S202, S204, S206, S208 and S210 | |
| 410 | One-dimensional data acquiring module |
| 420 | Data conversion module |
| 430 | Operation mode dividing module |
| 440 | Data prediction module |
| 441 | First unit |
| 442 | Second unit |
| 443 | Third unit |
| 444 | Fourth unit |
| 445 | Fifth unit |
| 446 | Sixth unit |
| 447 | Seventh unit |
| 61 | Memory |
| 62 | Processor |

DETAILED DESCRIPTION OF THE EXAMPLE EMBODIMENTS

A power load prediction method proposed in the embodiments of the present invention comprises: acquiring historical power load data in a one-dimensional time series for a set time length, which consists of data corresponding to each time point; converting the historical power load data in the one-dimensional time series to a three-dimensional matrix consisting of set time scales, days in each time scale, and time points in each day; dividing the historical power load data of the three-dimensional matrix into at least one operation mode depending on the size of the time scales; and, in each operation mode, taking the time scale as the unit, deriving the value band of power load data of each day in the operation mode in the next time scale to be predicted based on the historical power load data in each time scale.

In one implementation, in each operation mode, taking the time scale as the unit, deriving the value band of power load data of each day in the operation mode in the next time scale to be predicted based on the historical power load data in each time scale comprises: performing the following operations for each operation mode: taking the time scale as the unit, determining the representative load value of the historical power load data at each time point in a day in each time scale, to obtain a dominant load curve; for every two adjacent time scales, calculating the change in the dominant load curve of the latter time scale compared with the preceding time scale, to obtain a load change curve; deriving the dominant load curve of the next time scale to be predicted based on all the dominant load curves and all the load change curves; determining a confidence interval of the dominant load curve of the next time scale to be predicted based on the values of the historical power load data in each time scale; and obtaining the value band of power load data of each day in the operation mode in the next time scale to be predicted based on the dominant load curve and the confidence interval of the next time scale to be predicted.

In one implementation, dividing the historical power load data of the three-dimensional matrix into at least one operation mode depending on the size of the time scales comprises: when the time scale is smaller than a set first threshold, dividing the historical power load data of the three-dimensional matrix into one operation mode; when the time scale is greater than or equal to the first threshold, clustering the historical power load data of the three-dimensional matrix in the unit of day, to obtain a plurality of clusters, each corresponding to one operation mode.

In one implementation, after obtaining a plurality of clusters, the method further comprises: calculating the ratio of the days in each cluster to the total number of days, abandoning clusters with the ratio smaller than a set second threshold, and at the same time abandoning the operation modes corresponding to the clusters.

In one implementation, time scales smaller than the first threshold include: month or week; time scales greater than the first threshold include: year.

In one implementation, the time scale is one month or one week; converting the historical power load data in the one-dimensional time series to a three-dimensional matrix consisting of set time scales, days in each time scale, and time points in each day comprises: converting the historical power load data in the one-dimensional time series to an initial three-dimensional matrix consisting of years, days in each year and time points in each day; and converting the initial three-dimensional matrix to a three-dimensional matrix consisting of the time scales, days in each time scale and time points in each day.

In one implementation, after obtaining one load change curve, the method further comprises: obtaining external data in the time period corresponding to the load change curve, wherein the external data comprises weather data and/or production plan data; calculating the relevance of the external data to the load change curve; determining that the external data is relevant to the load change curve when the relevance is greater than a set third threshold; determining that the external data is relevant to power load data when the proportion of all load change curves with relevant external data in the corresponding time periods reaches a set fourth threshold; and deriving the dominant load curve of the next time scale to be predicted based on all the dominant load curves and all the load change curves, specifically: deriving the dominant load curve of the next time scale to be predicted based on all the dominant load curves, all the load change curves and the current external data.

A power load prediction apparatus proposed in the embodiments of the present invention comprises: a one-dimensional data acquiring module, used to acquire historical power load data in a one-dimensional time series for a set time length, which consists of data corresponding to each time point; a data conversion module, used to convert the historical power load data in the one-dimensional time series to a three-dimensional matrix consisting of set time scales, days in each time scale, and time points in each day; an operation mode dividing module, used to divide the historical power load data of the three-dimensional matrix into at least one operation mode depending on the size of the time scales; and a data prediction module, used to, in each operation mode, taking the time scale as the unit, derive the value band of power load data of each day in the operation mode in the next time scale to be predicted based on the historical power load data in each time scale.

In one implementation, the data prediction module comprises: a first unit, used to, in each operation mode, taking the time scale as the unit, determine the representative load value of the historical power load data at each time point in a day in each time scale, to obtain a dominant load curve; a second unit, used to, in each operation mode, for every two adjacent time scales, calculate the change in the dominant load curve of the latter time scale compared with the preceding time scale, to obtain a load change curve; a third unit, used to, in each operation mode, derive the dominant load curve of the next time scale to be predicted based on all the dominant load curves and all the load change curves; a fourth unit, used to, in each operation mode, determine a confidence interval of the dominant load curve of the next time scale to be predicted based on the values of the historical power load data in each time scale; and a fifth unit, used to, in each operation mode, obtain the value band of power load data of each day in the operation mode in the next time scale to be predicted based on the dominant load curve and the confidence interval of the next time scale to be predicted.

In one implementation, the operation mode dividing module divides the historical power load data of the three-dimensional matrix into one operation mode when the time scale is smaller than a set first threshold; and clusters the historical power load data of the three-dimensional matrix in the unit of day, to obtain a plurality of clusters, each corresponding to one operation mode, when the time scale is greater than or equal to the first threshold.

In one implementation, the apparatus further comprises: a simplifying module, used to calculate the ratio of the days in each cluster to the total number of days, abandon clusters with the ratio smaller than a set second threshold, and at the same time abandon the operation modes corresponding to the clusters.

In one implementation, time scales smaller than the first threshold include: month or week; time scales greater than the first threshold include: year.

In one implementation, the time scale is one month or one week; the data conversion module firstly converts the historical power load data in the one-dimensional time series to an initial three-dimensional matrix consisting of years, days in each year and time points in each day, and then converts the initial three-dimensional matrix to a three-dimensional matrix consisting of the time scales, days in each time scale and time points in each day.

In one implementation, the data prediction module further comprises: a sixth unit, used to obtain external data in the time period corresponding to each load change curve obtained by the second unit, wherein the external data comprises weather data and/or production plan data; calculate the relevance of the external data to the load change curve; and determine that the external data is relevant to the load change curve when the relevance is greater than a set third threshold; and a seventh unit, used to determine that the external data is relevant to power load data when the proportion of all load change curves with relevant external data in the corresponding time periods reaches a set fourth threshold; and the fifth unit derives the dominant load curve of the next time scale to be predicted based on all the dominant load curves, all the load change curves and the current external data.

Another power load prediction apparatus proposed in the embodiments of the present invention comprises: at least one memory and at least one processor, wherein, the at least one memory is used to store a computer program; the at least one processor is used to call the computer program stored in the at least one memory, to execute the power load prediction method described in any of the above implementations.

A cloud platform or server proposed in the embodiments of the present invention comprises a power load prediction apparatus described in any of the above implementations.

A computer-readable storage medium proposed in the embodiments of the present invention has a computer program stored thereon; it is characterized in that the computer program can be executed by a processor and implement the power load prediction method described in any of the above implementations.

A computer program product proposed in the embodiments of the present invention is stored on a computer-readable storage medium, comprises a computer program instruction, which, when executed, causes at least one processor to execute the power load prediction method described in any of the above implementations.

It can be seen from the above solution that, in the embodiments of the present invention, data in a one-dimensional time series is converted to data of a three-dimensional matrix based on a time scale, then the data is divided into operation modes based on the data of the three-dimensional matrix, and, in each operation mode, power load data of the next time scale is predicted based on historical power load data in each time scale. Accuracy of power load prediction can be improved because the prediction method is based on historical power load data rather than user tags, and uses a technique based on data of a three-dimensional matrix for prediction instead of techniques based on one-dimensional time series for time series analysis that tend to lose data characteristics.

In addition, in each operation mode, the time scale is taken as the unit to determine the dominant load curve of the historical load data in each time scale, and for every two adjacent time scales, the change curve of the dominant load curve of the latter time scale compared with the preceding time scale is calculated, thus deriving the dominant load curve of the next time scale to be predicted; the confidence interval of the dominant load curve of the next time scale to be predicted is determined based on the values of the historical power load data in each time scale; and the value band of power load data of each day in the operation mode in the next time scale to be predicted is obtained based on the dominant load curve and the confidence interval of the next time scale to be predicted. Statistical techniques are mainly used in the process, and therefore it is easy to implement and can ensure prediction accuracy.

Further, since sufficient consideration is given to possible significant fluctuations in internal data across a long time scale, data in the converted three-dimensional matrix is clustered in the unit of day for long time scales, thereby making it possible to classify days with similar characteristics as one cluster, corresponding to one operation mode. Then, in each operation mode, the historical power load data in each time scale is used to predict the power load in the next time scale, which further improves prediction accuracy.

In addition, after the clustering, the ratio of the days in each cluster to the total number of days is calculated, and clusters with the ratio smaller than a set second threshold and at the same time the operation modes corresponding to the clusters are abandoned, which reduces the calculation work for useless operation modes and saves resources for calculation and storage.

Moreover, in the conversion to the three-dimensional matrix, the historical power load data in the one-dimensional time series is converted to a three-dimensional matrix based on a longer time scale, thus providing higher applicability of the three-dimensional matrix, i.e., the complex conversion from one-dimensional data to a three-dimensional data needs to be performed only once before data in both longer and shorter time scales can be easily further converted through the three-dimensional matrix based on a long time scale, without the need to perform again the complex conversion from one-dimensional data to three-dimensional data, thereby reducing the difficulty in data processing.

Lastly, the relevance of external data to load change curves is calculated to determine the effects on external data on load changes, and, when certain effects exist, external data are taken into account in the prediction of data in the next time scale, thereby further improving accuracy of data prediction.

In order to be concise and intuitive in the description, the solution of the present invention is described below with reference to several representative embodiments. The large number of details in the implementations are intended only to facilitate understanding of the solution of the present invention, but it is obvious that the technical solution of the present invention may be implemented without being limited to these details. In order to avoid unnecessarily obscuring the solution of the present invention, some embodiments are not described in detail, but only a framework is given. Hereinafter, "including" means "including but not limited to", and "according to . . . " means "at least according to . . . , but not limited to . . . ". Due to Chinese language habits, when the quantity of an element is not specified hereinafter, it means that there may be one or several of the element, or it can be understood as there is at least one of it.

In the embodiments of the present invention, consideration is given to the fact that techniques used in time series analysis are widely used since power load data (for example, power data) can be characterized by time series, i.e., power load data are data in one-dimensional time series. However, some characteristics of historical data may be lost because time series analysis is based only on one-dimensional data for prediction. For this, in the embodiments of the present invention, through creative work, it is conceived to convert data in one-dimensional time series to data of a three-dimensional matrix, and then to predict power load based on data of the three-dimensional matrix. In addition, in the embodiments of the present invention, power load may be predicted based on different time scales (for example, year, month, week, etc.). For example, the power load data in the coming year is predicted based on the power load data in previous years (for example, two years); for another example, the power load data in the coming month is predicted based on the power load data in the previous months (for example, 24 months); for yet another example, the power load data in the coming week is predicted based on the power load data in previous weeks (for example, 52 weeks).

The present invention is further described in detail with reference to the drawings and the embodiments, so that its technical solution and advantages become clearer. It should be understood that the specific embodiments described here are only used to illustratively explain the present invention, and are not used to limit the scope of the present invention.

Figure 1:
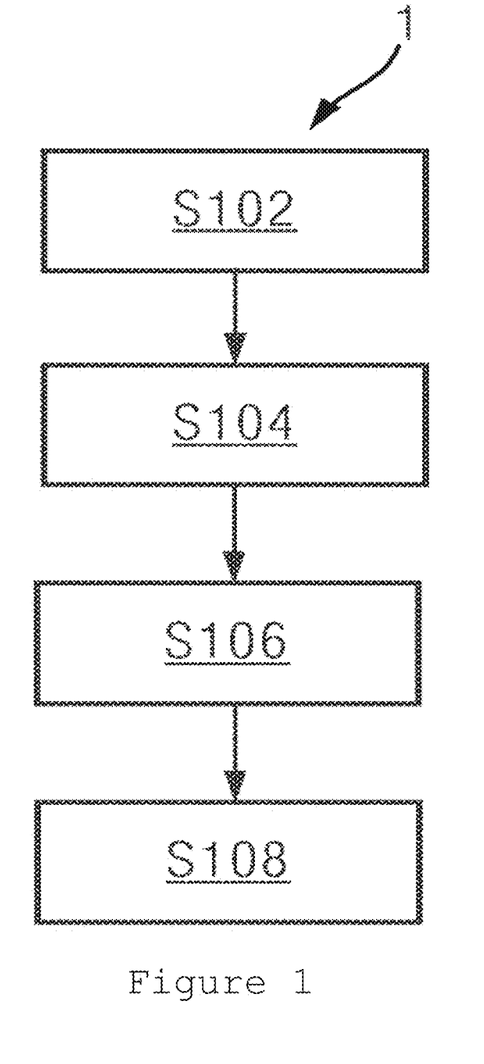
FIG. 1 is an example flowchart of a power load prediction method in the embodiments of the present invention.

FIG. 1 is an example flowchart of a power load prediction method 1 in the embodiments of the present invention. As shown in FIG. 1, the method 1 may comprise the following steps:

Step S102, acquiring historical power load data in a one-dimensional time series for a set time length, which consists of data corresponding to each time point.

In this step, the set time length may be determined based on actual needs. For example, the set time length may be 2 years when the time scale is one year.

Step S104, converting the historical power load data in the one-dimensional time series to a three-dimensional matrix consisting of set time scales, days in each time scale, and time points in each day.

For example, if the time scale is greater than or equal to a set first threshold, being for example, one year, the historical power load data in the one-dimensional time series may be converted to a three-dimensional matrix consisting of years, days in each year, and time points in each day in this step. For example, if data are collected at 96 time points in a day, there are 365 days in a year, and the time length of the historical power load data is 2 years, a matrix can be obtained with 2, 365 and 96 points respectively on the three dimensions.

For another example, if the time scale is smaller than the first threshold, being for example, one month, the historical power load data in the one-dimensional time series may be converted to a three-dimensional matrix consisting of months, days in each month, and time points in each day in this step; if the time scale is one week, the historical power load data in the one-dimensional time series can be converted to a three-dimensional matrix consisting of weeks, days in each week, and time points in each day. In addition, when the time scale is smaller than the first threshold, being for example, one month or one week, in specific implementation, the historical power load data in the one-dimensional time series may be firstly converted to an initial three-dimensional matrix consisting of years, days in each year and time points in each day, and then the initial three-dimensional matrix is converted to a three-dimensional matrix consisting of the time scales, for example, months (or weeks), days in each time scale, for example, month (or week), and time points in each day.

Step S106, dividing the historical power load data of the three-dimensional matrix into at least one operation mode depending on the size of the time scale. Here, an operation mode may be understood as a cluster of data with similar characteristics. For example, if power load data curves are plotted taking day as the unit, the power load data of all the days with a similar curve shape is in one cluster, i.e., one operation mode.

In this step, in specific implementation, in consideration that data fluctuates significantly in a long time scale, for example, one year, prediction accuracy may not be high when a single operation mode is defined to predict the power load in the next year by use of the data in a whole year because the data is not very regular. For this, when the time scale is long, the historical power load data of the three-dimensional matrix may be clustered taking day as the unit. In this way, all the days with similar characteristics can be divided into one cluster, thereby obtaining a plurality of different clusters, each corresponding to one operation mode. When the time scale is short, being for example, one month or one week, only one operation mode may be defined, and the data in a whole month or a whole week is used to predict the data in the subsequent entire month or entire week.

That is, in this step, the historical power load data of the three-dimensional matrix may be divided into one operation mode when the time scale is smaller than a set first threshold; and the historical power load data of the three-dimensional matrix is clustered in the unit of day, to obtain a plurality of clusters, each corresponding to one operation mode, when the time scale is greater than or equal to the first threshold. Wherein, the first threshold may be set based on actual conditions, for example, to a reasonable value such as 50 days, 60 days, 100 days, 200 days, etc., which is not limited here.

Further, when several operation modes are defined, in order to reduce calculation for useless operation modes, after obtaining a plurality of clusters, the ratio of the days in each cluster to the total number of days can be further calculated, and clusters with the ratio smaller than a set second threshold and at the same time the operation modes corresponding to the clusters are abandoned. For example, for two years with a total of 730 days, if a cluster comprises a few days, such as only one day, or three or five days, or even ten days or half a month, the cluster and the corresponding operation mode can be abandoned. The second threshold may be set based on actual conditions, which is not limited here.

Step S108, in each operation mode, taking the time scale as the unit, deriving the value band of the power load data of each day in the operation mode in the next time scale to be predicted based on the historical power load data in each time scale.

In this step, there may be several methods for the specific implementation.

For example, a trained neural network prediction model may be used for prediction, i.e., the historical power load data in each time scale is used as the input to the neural network prediction model, and the value band of the power load date of each day in the operation mode in the next time scale to be predicted output from the neural network prediction model is received.

Figure 2:
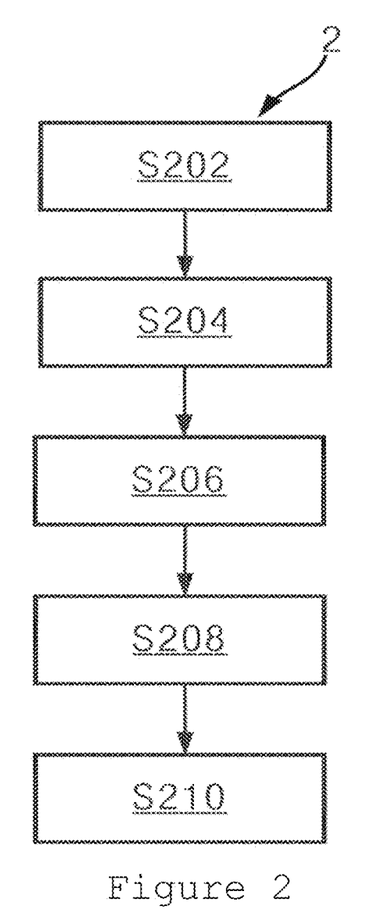
FIG. 2 is schematic diagram of the method for deriving the power load data in the next time scale to be predicted based on the historical power load data in each time scale.

For another example, the following method may also be used for prediction, i.e., each step in the method 2 as shown in FIG. 2 to derive the power load data in the next time scale to be predicted based on the historical power load data in each time scale may be performed for each operation mode.

Step S202, taking the time scale as the unit, determining the representative load value of the historical power load data at each time point in a day in each time scale, to obtain a dominant load curve.

For example, when there are 96 time points in one day, assuming that the time scale is one month, then the value at the 1st time point of each day in a month may be used to determine the representative load value at the 1st time point, the value at the 2nd time point of each day in a month may be used to determine the representative load value at the 2nd time point, the value at the 3rd time point of each day in a month may be used to determine the representative load value at the 3rd time point, and so on, until the value at the 96th time point of each day in a month is used to determine the representative load value at the 96th time point, thereby obtaining a dominant load curve consisting of 96 representative load values.

Step S204, for every two adjacent time scales, calculating the change in the dominant load curve of the latter time scale compared with the preceding time scale, to obtain a load change curve.

Step S206, deriving the dominant load curve of the next time scale to be predicted based on all the dominant load curves and all the load change curves.

Step S208, determining a confidence interval of the dominant load curve of the next time scale to be predicted based on the values of the historical power load data in each time scale.

Step 210, obtaining the value band of power load data of each day in the operation mode in the next time scale to be predicted based on the dominant load curve and the confidence interval of the next time scale to be predicted.

Figure 3:
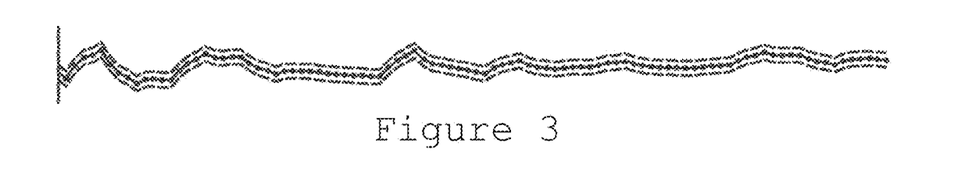
FIG. 3 is a schematic diagram of the value band of power load data of each day in an operation mode in the next time scale to be predicted in one example of the present invention.

FIG. 3 is a schematic diagram of the value band of power load data of each day in an operation mode in the next time scale to be predicted in one example. In FIG. 3, a day with 96 time points is taken as an example, and it can be seen that the curve with dots is the dominant load curve in the next time scale to be predicted, while the two curves above and below it are respectively the upper and the lower confidence intervals.

In the method shown in FIG. 2, after Step S204, the method may further comprise: obtaining external data in the time period corresponding to the load change curve, wherein the external data comprises weather data and/or production plan data; calculating the relevance of the external data to the load change curve; determining that the external data is relevant to the load change curve when the relevance is greater than a set third threshold; and determining that the external data is relevant to power load data when the proportion of all load change curves with relevant external data in the corresponding time periods reaches a set fourth threshold. Accordingly, in Step S206, the dominant load curve of the next time scale to be predicted may be derived based on all the dominant load curves, all the load change curves and the current external data. Otherwise, if it is determined that the external data is irrelevant to power load data, it is only necessary to derive the dominant load curve of the next time scale to be predicted based on all the dominant load curves and all the load change curves in Step S206. The third threshold and the fourth threshold may be set based on actual conditions, which are not limited here.

The power load prediction methods in the embodiments of the present invention are described in detail above. The power load prediction apparatuses in the embodiments of the present invention will then be described below. The apparatuses in the embodiments of the present invention may be used to implement the above methods in the embodiments of the present invention. Please refer to the corresponding description of the method embodiments above for item not disclosed in detail for the apparatus embodiments of the present invention, which will not be repeated here.

Figure 4:
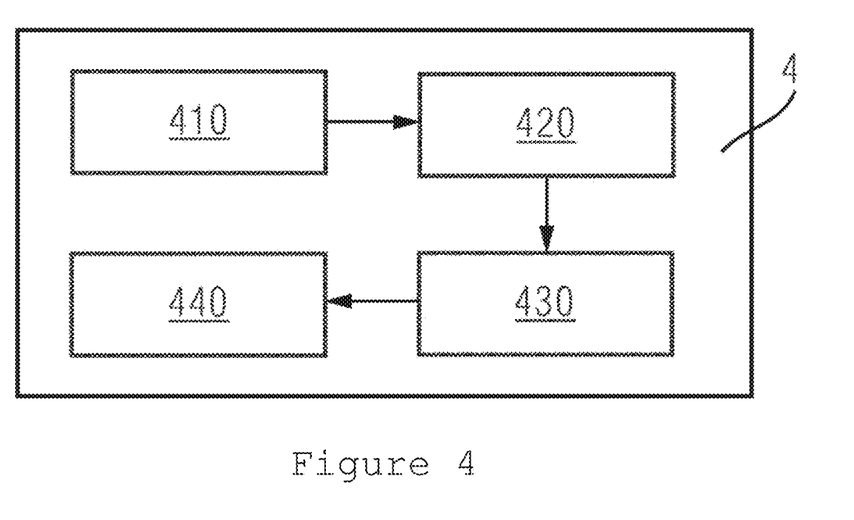
FIG. 4 is an example structural diagram of a power load prediction apparatus in the embodiments of the present invention.

FIG. 4 is an example structural diagram of a power load prediction apparatus in the embodiments of the present invention. As shown by the solid lines in FIG. 4, the apparatus 4 may comprise: a one-dimensional data acquiring module 410, a data conversion module 420, an operation mode dividing module 430, and a data prediction module 440.

The one-dimensional data acquiring module 410 is used to acquire historical power load data in a one-dimensional time series for a set time length, which consists of data corresponding to each time point.

The data conversion module 420 is used to convert the historical power load data in the one-dimensional time series to a three-dimensional matrix consisting of set time scales, days in each time scale, and time points in each day. For example, if the time scale is greater than or equal to a set first threshold, being for example, one year, the data conversion module 420 can convert the historical power load data in the one-dimensional time series to a three-dimensional matrix consisting of years, days in each year, and time points in each day. For another example, if the time scale is smaller than the first threshold, being for example, one month, the data conversion module 420 can convert the historical power load data in the one-dimensional time series to a three-dimensional matrix consisting of months, days in each month, and time points in each day; if the time scale is one week, the data conversion module 420 can convert the historical power load data in the one-dimensional time series to a three-dimensional matrix consisting of weeks, days in each week, and time points in each day. In addition, when the time scale is smaller than the first threshold, being for example, one month or one week, in specific implementation, the historical power load data in the one-dimensional time series may be firstly converted to an initial three-dimensional matrix consisting of years, days in each year and time points in each day, and then the initial three-dimensional matrix is converted to a three-dimensional matrix consisting of the time scales, for example, months (or weeks), days in each time scale, for example, month (or week), and time points in each day.

The operation mode dividing module 430 is used to divide the historical power load data of the three-dimensional matrix into at least one operation mode depending on the size of the time scale.

In one implementation, the operation mode dividing module 430 can divide the historical power load data of the three-dimensional matrix into one operation mode when the time scale is smaller than a set first threshold; and cluster the historical power load data of the three-dimensional matrix in the unit of day, to obtain a plurality of clusters, each corresponding to one operation mode, when the time scale is greater than or equal to the first threshold. In another implementation, when several clusters are required, the apparatus 3 may further comprise a simplifying module (not shown in FIG. 4), used to calculate the ratio of the days in each cluster to the total number of days, abandon clusters with the ratio smaller than a set second threshold, and at the same time abandon the operation modes corresponding to the clusters.

The data prediction module 440 is used to, in each operation mode, taking the time scale as the unit, derive the value band of the power load data of each day in the operation mode in the next time scale to be predicted based on the historical power load data in each time scale.

Figure 5:
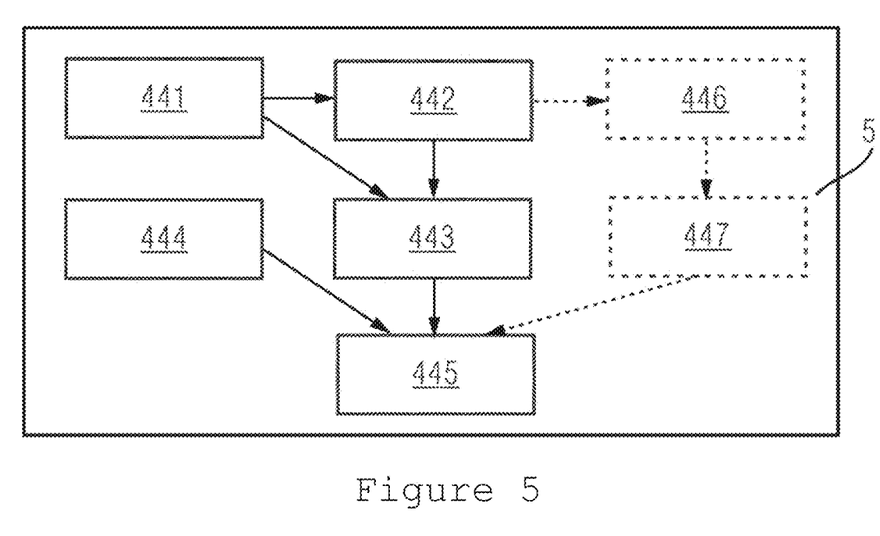
FIG. 5 is a schematic structural diagram of the data prediction module shown in FIG. 3 in the embodiments of the present invention.

In specific implementation, the data prediction module 440 may be implemented in several forms. For example, in one implementation, the data prediction module 440 may have the structure shown by the solid lines in FIG. 5. As shown in FIG. 5, the data prediction module 440 may comprise: a first unit 441, a second unit 442, a third unit 443, a fourth unit 444, and a fifth unit 445.

Wherein, the first unit 441 is used to, in each operation mode, taking the time scale as the unit, determine the representative load value of the historical power load data at each time point in a day in each time scale, to obtain a dominant load curve.

The second unit 442 is used to, in each operation mode, for every two adjacent time scales, calculate the change in the dominant load curve of the latter time scale compared with the preceding time scale, to obtain a load change curve.

The third unit 443 is used to, in each operation mode, derive the dominant load curve of the next time scale to be predicted based on all the dominant load curves and all the load change curves.

The fourth unit 444 is used to, in each operation mode, determine a confidence interval of the dominant load curve of the next time scale to be predicted based on the values of the historical power load data in each time scale.

The fifth unit 445 is used to, in each operation mode, obtain the value band of power load data of each day in the operation mode in the next time scale to be predicted based on the dominant load curve and the confidence interval of the next time scale to be predicted.

In one implementation, the data prediction module 440 as shown in FIG. 5 may further comprise a sixth unit 446 and a seventh unit 447, as shown by the dotted lines in FIG. 4.

The sixth unit 446 is used to obtain external data in the time period corresponding to each of the load change curves obtained by the second unit 442, wherein the external data comprises weather data and/or production plan data; calculate the relevance of the external data to the load change curve; and determine that the external data is relevant to the load change curve when the relevance is greater than a set third threshold.

The seventh unit 447 is used to determine that the external data is relevant to power load data when the proportion of all load change curves with relevant external data in the corresponding time periods reaches a set fourth threshold.

Accordingly, the fifth unit 445 can derive the dominant load curve of the next time scale to be predicted based on all the dominant load curves, all the load change curves and the current external data.

Figure 6:
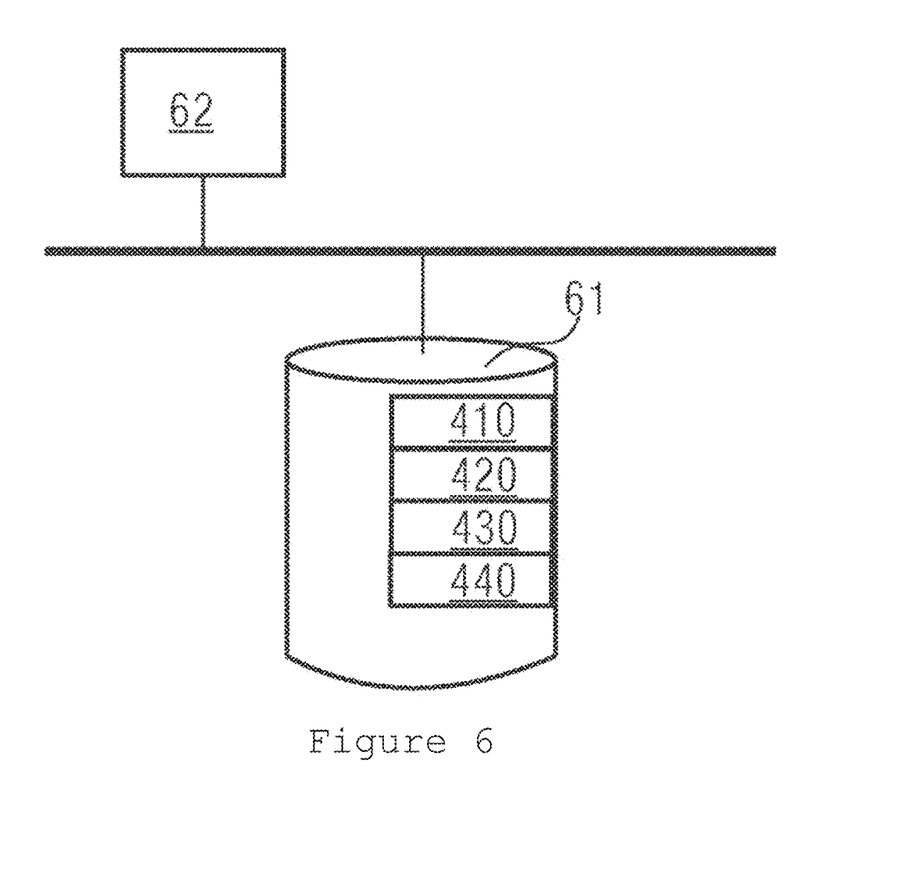
FIG. 6 is an example flowchart of another power load prediction apparatus in the embodiments of the present invention.

FIG. 6 is an example flowchart of another power load prediction apparatus in the embodiments of the present invention. As shown in FIG. 5, the apparatus may comprise: at least one memory 61 and at least one processor 62. In addition, some other components, for example, communication ports, etc., may also be comprised. These components communicate via a bus.

The at least one memory 61 is used to store a computer program. In one implementation, the computer program may be understood as comprising each of the modules of the power load prediction apparatus as shown in FIG. 4. In addition, the at least one memory 61 may also store an operating system, etc. The operating system may be but is not limited to: an Android operating system, a Symbian operating system, a Windows operating system, a Linux operating system, etc.

The at least one processor 62 is used to call the computer program stored in the at least one memory 61 to execute the power load prediction methods described in the embodiments of the present invention. The processor 62 may be a CPU, a processing unit/module, and ASIC, a logic module, a programmable gate array, etc. It can receive and send data through the communication ports.

In addition, a server, or a server cluster, or a cloud platform, etc. comprising the power load prediction apparatus shown in FIG. 2 or 3 above is also provided in the embodiments of the present invention.

It should be noted that not all steps and modules in the above flowcharts and structural diagrams are necessary, and some steps or modules can be ignored based on actual needs. The sequence of execution of the steps is not fixed, and can be adjusted as needed. A functional division of the modules is used only to facilitate the description. In actual implementation, a module may be implemented by multiple modules, and the functions of multiple modules may be implemented by a single module. These modules may be located in a single device or in different devices.

It is understandable that the hardware modules in each embodiment above may be implemented mechanically or electronically. For example, a hardware module may comprise specially designed permanent circuits or logic devices (for example, dedicated processors, such as FPGA or ASIC) to complete specific operations. A hardware module may also comprise programmable logic devices or circuits temporarily configured by software (for example, general-purpose processors or other programmable processors) for performing specific operations. Whether to specifically use mechanical methods or dedicated permanent circuits or temporarily configured circuits (such as software configuration) to implement hardware modules may be determined according to cost and schedule considerations.

In addition, the embodiments of the present invention also provide computer software that can be executed on a server or a server cluster or a cloud platform. The computer software can be executed by a processor and implement the power load prediction methods described in the embodiments of the present invention.

Moreover, a computer-readable storage medium is also provided in the embodiments of the present invention, which has a computer program stored thereon, which can be executed by a processor and implement the power load prediction methods described in the embodiments of the present invention. Specifically, a system or device equipped with a storage medium may be provided, and the software program code for implementing the functions of any of the above implementations is stored on the storage medium, so that a computer (or CPU or MPU) of the system or device reads and executes the program code stored in the storage medium. In addition, the operating system operating on the computer may also be used to perform part or all of the actual operations through instructions based on the program code. It is also possible to write the program code read from the storage medium to the memory provided in an expansion board inserted into the computer or to the memory provided in an expansion unit connected to the computer, and then the program code-based instructions cause the CPU, etc. mounted on the expansion board or the expansion unit to perform part and all of the actual operations, so as to implement the functions of any of the above embodiments. Implementations of the storage media used to provide the program code include floppy disks, hard disks, magneto-optical disks, optical disks (such as CD-ROM, CD-R, CD-RW, DVD-ROM, DVD-RAM, DVD-RW, DVD+RW), magnetic tapes, non-volatile memory cards and ROMs. Optionally, the program code may be downloaded from a server computer via a communication network.

A computer program product is provided in the embodiments of the present invention, which is stored on a computer-readable storage medium, and comprises a computer program instruction, which, when executed, causes at least one processor to execute the power load prediction method described in any of the above implementations.

It can be seen from the above solution that, in the embodiments of the present invention, data in a one-dimensional time series is converted to data of a three-dimensional matrix based on a time scale, then the data is divided into operation modes based on the data in the three-dimensional matrix, and, in each operation mode, power load data of the next time scale is predicted based on historical power load data in each time scale. Accuracy of power load prediction can be improved because the prediction method is based on historical power load data rather than user tags, and uses a technique based on data of a three-dimensional matrix for prediction instead of techniques based on one-dimensional time series for time series analysis that tend to lose data characteristics.

In addition, in each operation mode, the time scale is taken as the unit to determine the dominant load curve of the historical load data in each time scale, and for every two adjacent time scales, the change curve of the dominant load curve of the latter time scale compared with the preceding time scale is calculated, thus deriving the dominant load curve of the next time scale to be predicted; the confidence interval of the dominant load curve of the next time scale to be predicted is determined based on the values of the historical power load data in each time scale; and the value band of power load data of each day in the operation mode in the next time scale to be predicted is obtained based on the dominant load curve and the confidence interval of the next time scale to be predicted. Statistical techniques are mainly used in the process, and therefore it is easy to implement and can ensure prediction accuracy.

Further, since sufficient consideration is given to possible significant fluctuations in internal data across a long time scale, data of the converted three-dimensional matrix is clustered in the unit of day for long time scales, thereby making it possible to classify days with similar characteristics as one cluster, corresponding to one operation mode. Then, in each operation mode, the historical power load data in each time scale is used to predict the power load data in the next time scale, which further improves prediction accuracy.

In addition, after the clustering, the ratio of the days in each cluster to the total number of days is calculated, and clusters with the ratio smaller than a set second threshold and at the same time the operation modes corresponding to the clusters are abandoned, which reduces the calculation work for useless operation modes and saves resources for calculation and storage.

Moreover, in the conversion to the three-dimensional matrix, the historical power load data in the one-dimensional time series is converted to a three-dimensional matrix based on a longer time scale, thus providing higher applicability of the three-dimensional matrix, i.e., the complex conversion from one-dimensional data to a three-dimensional data needs to be performed only once before data in both longer and shorter time scales can be easily further converted through the three-dimensional matrix based on a long time scale, without the need to perform again the complex conversion from one-dimensional data to three-dimensional data, thereby reducing the difficulty in data processing.

Lastly, the relevance of external data to load change curves is calculated to determine the effects on external data on load changes, and, when certain effects exist, external data are taken into account in the prediction of data in the next time scale, thereby further improving accuracy of data prediction.

The above are only the preferred embodiments of the present invention, and are not intended to limit the present invention. Any modification, equivalent replacement and improvement made without departing from the motivation and principle of the present invention shall be included in its scope.

What is claimed is:

1. A power load prediction method, comprising:
acquiring, by a power load prediction apparatus, historical power load data in a one-dimensional time series for a time length, the historical power load data including respective data corresponding to each respective time point of the time length;
converting, by the power load prediction apparatus, the historical power load data in the one-dimensional time series to a three-dimensional matrix including time scales, days in each respective time scale, and time points in each respective day;
dividing, by the power load prediction apparatus, the historical power load data of the three-dimensional matrix into a plurality of operation modes based on a size of each respective time scale, wherein the dividing includes
for a first time scale among the time scales, clustering the historical power load data of the three-dimensional matrix of the first time scale in a unit of day, to obtain a plurality of clusters, each of the plurality of clusters corresponding to an operation mode among the plurality of operations modes;
calculating a ratio of days in each of the plurality of clusters to a total number of days;
abandoning clusters with a ratio smaller than a threshold number of days and abandoning operation modes, among the plurality of operation modes, corresponding to the clusters with the ratio smaller than the threshold number of days; and
predicting, for operation of a power grid and for each remaining operation mode, a value band of power load data of each respective day in the remaining operation mode in a next time scale to be predicted based on the historical power load data in each respective time scale, wherein the value band of the power load data of each respective day in the remaining operation mode in the next time scale is predicted using a neural network with the historical power load data in each respective time scale as an input into the neural network.

2. The power load prediction method of claim 1, wherein the predicting includes for each remaining operation mode
determining a representative load value of the historical power load data at each respective time point in a day in each respective time scale, to obtain a dominant load curve;
calculating, for every two adjacent time scales, a change in the dominant load curve of a latter time scale compared with a preceding time scale, to obtain a load change curve;
deriving the dominant load curve of the next time scale to be predicted based on all the dominant load curves and all the load change curves;
determining a confidence interval of the dominant load curve of the next time scale to be predicted based on values of the historical power load data in each respective time scale; and
obtaining the value band of power load data of each respective day in the remaining operation mode in the next time scale to be predicted based on the dominant load curve and the confidence interval of the next time scale to be predicted.

3. The power load prediction method of claim 2, wherein, after obtaining the load change curve, the method further comprises:
obtaining external data in a time period corresponding to the load change curve, wherein the external data includes at least one of weather data or production plan data;
calculating a relevance of the external data to the load change curve;
determining that the external data is relevant to the load change curve in response to the relevance being greater than a third threshold;
determining that the external data is relevant to power load data in response to a proportion of all load change curves with relevant external data in the corresponding time periods reaching a fourth threshold; and
deriving the dominant load curve of the next time scale to be predicted based on all the dominant load curves and all the load change curves.

4. The power load prediction method of claim 3, wherein the deriving the dominant load curve includes deriving the dominant load curve of the next time scale to be predicted based on all the dominant load curves, all the load change curves and the external data.

5. The power load prediction method of claim 1, wherein the dividing includes:
for a second time scale among the time scales, dividing the historical power load data of the three-dimensional matrix of the second time scale into one operation mode, the second time scale being smaller than a first threshold the first time scale is greater than or equal to the first threshold.

6. The power load prediction method of claim 5, wherein time scales smaller than the first threshold include month or week; and
time scales greater than the first threshold include year.

7. The power load prediction method of claim 6, wherein when the respective time scale is one month or one week, converting comprises:
converting the historical power load data in the one-dimensional time series to an initial three-dimensional matrix including years, days in each year, and time points in each respective day, the time points in each day including at least 96 time points; and
converting the initial three-dimensional matrix to the three-dimensional matrix including the time scales, days in each respective time scale, and respective time points in each respective day.

8. A power load prediction apparatus, comprising:
at least one memory to store a computer program; and
at least one processor to call the computer program stored in the at least one memory to execute the power load prediction method of claim 1.

9. A non-transitory computer-readable storage medium, storing a computer program, executable by a processor to implement the power load prediction method of claim 1.

10. A computer program product, stored on a non-transitory computer-readable storage medium, including a computer program instruction, which, when executed, causes at least one processor to execute the power load prediction method of claim 1.

11. A power load prediction apparatus, comprising:
processing circuitry configured to
acquire historical power load data in a one-dimensional time series for a time length, the historical power load data including data corresponding to each time point,
convert the historical power load data in the one-dimensional time series to a three-dimensional matrix including time scales, days in each respective time scale, and time points in each respective day,
divide the historical power load data of the three-dimensional matrix into a plurality of operation modes based on a size of each respective time scale, wherein
for a first time scale among the time scales, the historical power load data of the three-dimensional matrix of the first time scale are clustered in a unit of day, to obtain a plurality of clusters, each of the plurality of clusters corresponding to an operation mode among the plurality of operations modes,
calculate a ratio of days in each of the plurality of clusters to a total number of days,
abandon clusters with a ratio smaller than a threshold number of days and abandon operation modes, among the plurality of operation modes, corresponding to the clusters with the ratio smaller than the threshold number of days, and
predict, for operation of a power grid and for remaining operations modes, a value band of power load data of each respective day in the remaining operation mode in a next time scale to be predicted based on the historical power load data in each respective time scale,
wherein the value band of the power load data of each respective day in the remaining operation mode in the next time scale to be predicted is predicted using a neural network with the historical power load data in each respective time scale as an input into the neural network.

12. The power load prediction apparatus of claim 11, wherein the processing circuitry is configured to:

in each remaining operation mode, determine a representative load value of the historical power load data at each respective time point in a day in each respective time scale, to obtain a dominant load curve;

in each remaining operation mode, for every two adjacent time scales, calculate a change in the dominant load curve of a latter time scale compared with a preceding time scale, to obtain a load change curve;

in each remaining operation mode, derive a dominant load curve of the next time scale to be predicted based on all the dominant load curves and all the load change curves;

in each remaining operation mode, determine a confidence interval of the dominant load curve of the next time scale to be predicted based on values of the historical power load data in each respective time scale; and in each remaining operation mode, obtain the value band of power load data of each respective day in the remaining operation mode in the next time scale to be predicted based on the dominant load curve and the confidence interval of the next time scale to be predicted.

13. The power load prediction apparatus of claim 12, wherein the processing circuitry is configured to:
for a second time scale among the time scales, divide the historical power load data of the three-dimensional matrix of the second time scale into one operation mode, the second time scale being smaller than a first threshold the first time scale is greater than or equal to the first threshold.

14. The power load prediction apparatus of claim 13, wherein
time scales smaller than the first threshold include month or week; and time scales greater than the first threshold include year.

15. The power load prediction apparatus of claim 14, wherein the respective time scale is one month or one week; and
the processing circuitry is configured to convert the historical power load data in the one-dimensional time series to an initial three-dimensional matrix including years, days in each year and time points in each day, and convert the initial three-dimensional matrix to the three-dimensional matrix including the time scales, days in each respective time scale and time points in each respective day.

16. The power load prediction apparatus of claim 12, wherein the processing circuitry is configured to
obtain external data in a time period corresponding to each load change curve, wherein the external data includes at least one of weather data or production plan data;
calculate a relevance of the external data to the load change curve;
determine that the external data is relevant to the load change curve in response to the relevance being greater than a third threshold;
determine that the external data is relevant to power load data in response to a proportion of all load change curves with relevant external data in the corresponding time periods reaching a fourth threshold; and
derive the dominant load curve of the next time scale to be predicted based on all the dominant load curves, all the load change curves and the external data.

17. A cloud platform or server, comprising:
the power load prediction apparatus of claim 11.

* * * * *